United States Patent [19]

Babel

[11] Patent Number: 4,728,232
[45] Date of Patent: Mar. 1, 1988

[54] DEVICE FOR TEMPERATURE-RESPONSIVE ADJUSTMENT OF THE MEASURING POINTS OF TWO MACHINE TOOL PARTS

[75] Inventor: Werner Babel, Pfronten-Meilingen, Fed. Rep. of Germany

[73] Assignee: MAHO Aktiengesellschaft, Fed. Rep. of Germany

[21] Appl. No.: 941,058

[22] Filed: Dec. 12, 1986

[30] Foreign Application Priority Data

Feb. 13, 1986 [DE] Fed. Rep. of Germany ....... 3604550
Jul. 29, 1986 [EP] European Pat. Off. ........... 86110454

[51] Int. Cl.⁴ .......................... B23B 49/00; B23C 9/00
[52] U.S. Cl. .................................. 409/135; 33/125 T; 33/DIG. 19; 51/165.73; 408/8
[58] Field of Search ............... 409/135, 136, 238, 239; 33/125 T, 181 R, 315, DIG. 19; 408/4, 8, 16; 51/165.73; 81/29 B, 30, DIG. 1

[56] References Cited

U.S. PATENT DOCUMENTS

| | | | |
|---|---|---|---|
| 2,956,344 | 10/1960 | Rantsch | 409/238 |
| 4,100,837 | 7/1978 | Kohler | 409/238 |
| 4,530,626 | 7/1985 | Sabbioni | 409/135 X |
| 4,619,565 | 10/1986 | Schmid et al. | 409/135 |

FOREIGN PATENT DOCUMENTS 764960 9/1980 U.S.S.R. ............... 51/165.73

Primary Examiner—Z. R. Bilinsky
Attorney, Agent, or Firm—Baker, Maxham & Jester

[57] ABSTRACT

A device for the temperature-responsive adjustment of the measuring points of two relatively movable machine tool parts, the device comprising a rule mounted for limited movement on a first machine part, a scanning head mounted on the second machine part, and at least one transverse rod which is disposed for axial movement in a portion of the movable machine part that is particularly subject to being heated. The transverse rod, which extends right into the heated zones at least with its inner end portion, has its outer end connected to the rule by means of a reversing drive such that elongations of the transverse rod caused by heating are converted to a horizontal shifting movement of the rule. In an alternative embodiment, a bimetallic element performs the function of the transverse rod.

7 Claims, 3 Drawing Figures

DEVICE FOR TEMPERATURE-RESPONSIVE ADJUSTMENT OF THE MEASURING POINTS OF TWO MACHINE TOOL PARTS

FIELD OF THE INVENTION

The invention is directed to a device for the temperature-controlled adjustment of the measuring points of two relatively movable machine tool parts. The device comprises a rule mounted on the first machine part parallel to the axis, a scanning head mounted on the second machine part, and at least one heat-conducting element which is disposed for thermally caused movement in a portion of the movable machine part that is especially subject to being heated.

DISCUSSION OF THE PRIOR ART

One phenomenon that influences the accuracy of relative translatory motions of two machine parts resides in the thermal expansion of the machine parts caused by temperature variations occurring, for instance, during start-up of machine tools. Such heating phenomena are mainly caused by bearing friction of the structural components rotating in the respective machine parts such as the work spindle and its drive shafts in the spindle head of a machine tool. The effective length of the respectively used rules corresponds to the maximum feed distance of the movable machine part, but the heated machine parts are frequently longer than that maximum distance. Such temperature variations result in undesirable zero shifts of the rule.

These undesirable effects occur particularly with program-controlled machine tools comprising a horizontally movable spindle head, in which the rule is mounted on the spindle head and a scanning head is mounted on the stand. The programmed control of such machines is designed such that its position control circuit detect undesirable relative movements between the spindle head carrying the rule and the stationary scanning head and corrects such movement. But if the thermal expansions of the spindle head itself and the spindle mounted in the spindle head show different values, the scanning head cannot detect such differences. The result is that the position control circuit is supplied with correspondingly erroneous data. The same factor applies basically to the case in which the face of the spindle head has mounted thereon a vertical cutting head whose thermal expansion cannot be detected.

German Pat. No. 3,106,701 shows a measuring apparatus for machine tools with automatic temperature compensation. In this device the measuring and machining inaccuracies caused by thermal expansion phenomena are practically avoided in that a strain rod made of a material having a high coefficient of thermal expansion is disposed parallel to the axis of the spindle head with its rear end secured to the spindle head while its front end is secured to the rule. In this apparatus the thermal expansion of the strain rod is said to be approximately equal to the thermal expansion of the spindle head. In case of an elongation of the spindle head due to heating, the strain rod which is in direct engagement with the spindle head is likewise heated, while the forwardly expanding end of said strain rod drives the rule mounted thereon. Due to the different coefficients of thermal expansion between strain rod and spindle head, the elongation of the strain rod corresponds to the thermal expansion of the entire spindle head in longitudinal direction, including a vertical cutting head possibly mounted on the end face thereof.

Although this known measuring system has been found operative in practical use, there still result certain measuring errors which are due to the arrangement of the strain rod on the outer surface of the machine part, that is, the spindle head. Especially during start-up, measuring errors result due to delayed heat transfer from the thermally very highly loaded internal components to the rule.

For further improvement of the measuring accuracy it has been know from German Pat. No. 3,116,827 to provide in the machine part carrying the strain rod an axially movable heat-transfer bolt of especially high thermal conductivity in a portion of that machine part, for instance a bearing section, which is particularly exposed to heating. The heat-transfer bolt of this known device constitutes, as it were, a thermal bridge between the rapidly heated zones in the interior of the machine part and the strain rod, resulting in more rapid heating of the strain rod and thus in a corresponding elongation thereof.

However, even this improved device, which operates with compensation for thermal expansion, cannot fully satisfy the extremely high accuracy demands of modern machine tools. That is because the elongation of the strain rod and thus the driving movement of the rule are still determined by the external temperature of the machine part. In particular, the temperatures prevailing in the interior of the moving machine part cannot be detected and taken into account by this prior art device. This, in the case of spindle heads, has the result that the elongation of the work spindle mounted in the spindle head, including the spindle sleeves thereof, is greater than the thermal expansion of the spindle head itself. This is due to the higher temperatures prevailing in the interior of the moving machine part. The measuring errors resulting therefrom cannot be compensated and must be accepted.

SUMMARY OF THE INVENTION

It is a primary object of the invention to provide a device for the temperature-controlled adjustment of the measuring points of two relatively movable machine parts, by means of which improved compensation of different thermal expansion phenomena of the machine parts or the elements mounted therein can be achieved.

In accordance with the invention the stated object is solved in that a transverse rod, which at least with its inner end portion extends right into the heated zones of the machine part, is connected with its outer end to the rule by means of a reversing drive.

With this arrangement the thermal expansion of the rapidly and greatly heated transverse rod is converted by means of the reversing drive into corresponding longitudinal displacements of the rule. This conversion of the thermal elongation of the transverse rod is accomplished by means of a corresponding transmission factor in the reversing drive to an adjusting movement of the rule in adaptation to the respective conditions. Since the inner end of the transverse rod is disposed in the most strongly heated zones of the machine part, it is possible also to take into account the temperatures prevailing in those regions and to taken into account the thus caused elongations, for example, of a work spindle including its sleeve and to provide for compensation by means of the control circuit. In this connection, the material of the transverse bolt in respect of its coefficient of thermal expansion need not be accurately matched to the material and thus to the thermal expansion of the machine part, that is, the spindle head. By way of distinction, thermal expansions would need to be matched in the case when using a strain rod mounted on the sidewall of a spindle head.

In summary, the device according to the invention permits more accurate detection of the temperatures prevailing in and at the spindle head, thereby resulting in a response characteristic which is practically free from any delays. A more complete compensation of the thermal expansion of the various component parts is an additional benefit.

In accordance with a preferred embodiment of the invention, the reversing drive is a linkage mechanism which may comprise, for instance, an angle lever pivotally mounted on the machine part (spindle head), one arm of the lever being in resilient engagement with the free outer end of the transverse rod and the other arm having the rule fixed thereto. By corresponding choice of the length of the respective arms of the angle lever it is possible to select the transmission factor which is most suitable for the respective application or type of machine for converting the elongation of the transverse rod to a shifting movement of the rule.

In accordance with an alternative embodiment of the invention, which has an especially simple structure, the reversing drive may consist of a wedge surface at the outer end of the transverse rod for cooperation with a wedge surface of a shoe secured to the rule and longitudinally guided along the machine part. The rule is secured, as in the previously described embodiment, by means of two parallel leaf springs to the machine part (spindle head).

Moreover, further embodiments of the reversing drive are also conceivable, which convert the elongation of the transverse rod with a certain transmission factor into a longitudinal shifting movement of the rule. For instance, it is also possible to use screw rods, worm drive means, bimetallic elements or the like. When a bimetallic element is used, it should suitably be configured as a corner section or arcuate section and should be mounted with one leg thereof over a large area on the especially thermally sensitive forward portion of the spindle head. The heat of the spindle head is transferred to the sectioned bimetallic element and causes a deformation, which is converted to linear motion of the rule by the mounting of the rule on its reacting portion.

BRIEF DESCRIPTION OF THE DRAWING

The objects, features and advantages of the invention will be more readily apparent from the following detailed description, when read in conjunction with the accompanying drawing, in which.

DESCRIPTION OF THE PREFERRED EMBODIMENTS

Figure 1:
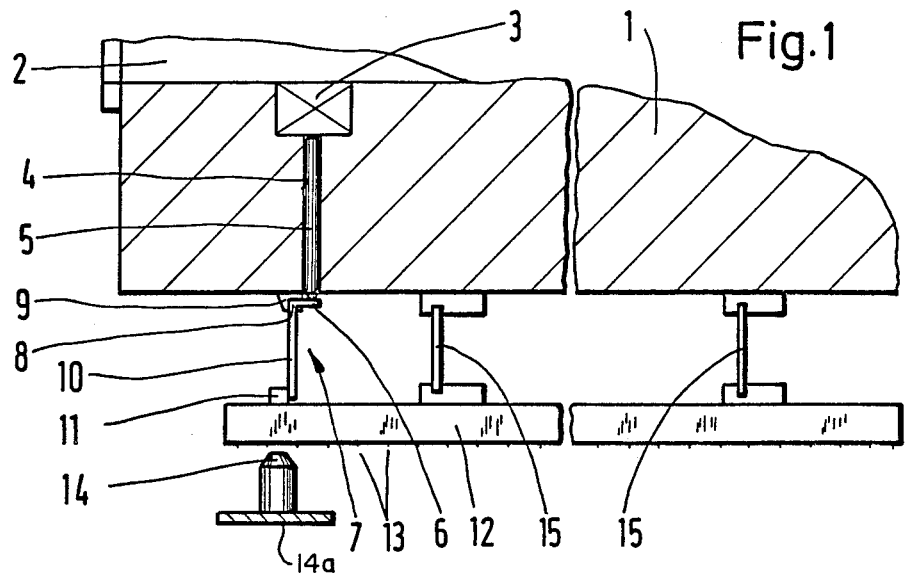
FIG. 1 is a schematic view of a device for the temperature-controlled adjustment of the measuring point on the spindle head of a milling machine in accordance with the invention.

With reference now to the drawing, and more particularly to FIG. 1 thereof, spindle 2 is rotatably mounted in spindle head 1. In the vicinity of spindle bearing 3 spindle head 1 is formed with transverse bore 4 in which a transverse rod 5 is received. The inner end of transverse rod 5 either is in direct contact with the outer shell of spindle bearing 3 or is otherwise fixed in the bore, for instance, by appropriate threaded engagement. The transverse rod which from the inner end is axially movable within bore 4, projects with its outer tip from the bore and presses against horizontal arm 6 of angle lever 7. Lever 7 is mounted for pivoting movement about horizontal axis 8 in bracket 9 secured to the spindle head. Vertical (as viewed in the drawing) arm 10 of angle lever 7 is in permanent contact with thrust pad 11 which is secured to the inner surface of rule 12. The outside of the rule includes graduations 13 which can be scanned by stationary scanning head 14 mounted to second machine part 14a. Rule 12 is secured to spindle head 1 by means of two leaf springs 15 in such a way that there is permanent pressure contact between vertical arm 10 of the angle lever and the thrust pad secured to the rule.

When the spindle head is heated in the vicinity of the bearing, transverse rod 5 longitudinally expands in accordance with its coefficient of thermal expansion by an amount corresponding to the respective temperature and thereby pivots angle lever 7. The vertical (as viewed in the drawing) arm of the lever shifts the rule horizontally by a corresponding amount against the action of leaf springs 15.

Figure 2:
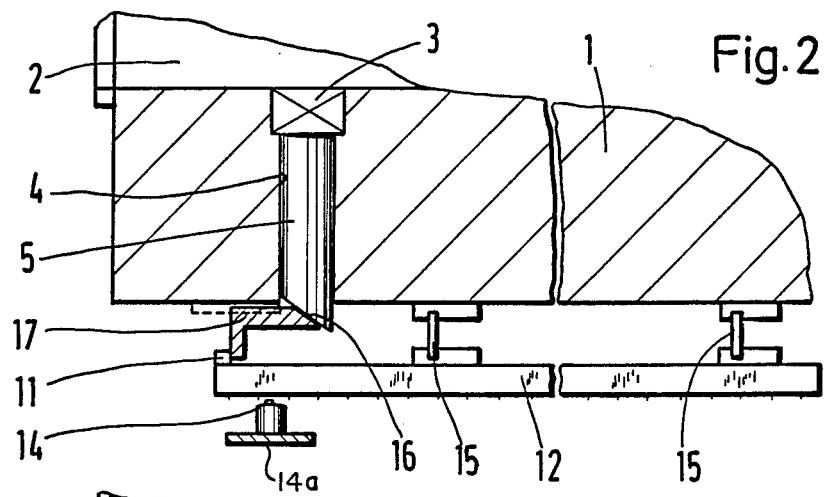
FIG. 2 is a schematic view of another embodiment of the measuring-value adjusting device of the invention.

The embodiment shown in FIG. 2 essentially corresponds to that of FIG. 1, but transverse rod 5 is formed with bevelled face 16 which is in permanent pressure contact with the correspondingly bevelled end face of slide 17. Slide 17 is movable in guide means indicated in dotted lines on the spindle head. Upon thermally caused elongation of rod 5, slide 17 presses against thrust pad 11 on rule 12, which is thereby horizontally shifted by a corresponding amount. In this embodiment, too, rule 12 is secured through the two leaf springs 15 on the side of the spindle head with a spacing therebetween, so that the thermal expansions of the spindle head will not be transferred to the thus thermally insulated rule 12.

The invention is not limited to the embodiments shown in FIGS. 1 and 2. Rather, various other systems are conceivable for converting the thermally caused elongation of rod 5 to a longitudinal shifting movement of rule 12. For instance, slide 17 of the embodiment of FIG. 2 may be replaced by a double-armed pivoted lever which is rotatably mounted at the side surface of spindle head 1 and is provided on its shorter arm with either an inclined face or a roller which is in resilient pressure contact with bevelled face 16 of transverse rod 5. The longer end of the pivoted lever may be in engagement with thrust pad 11 so as to achieve the required transmission ratio.

Figure 3:
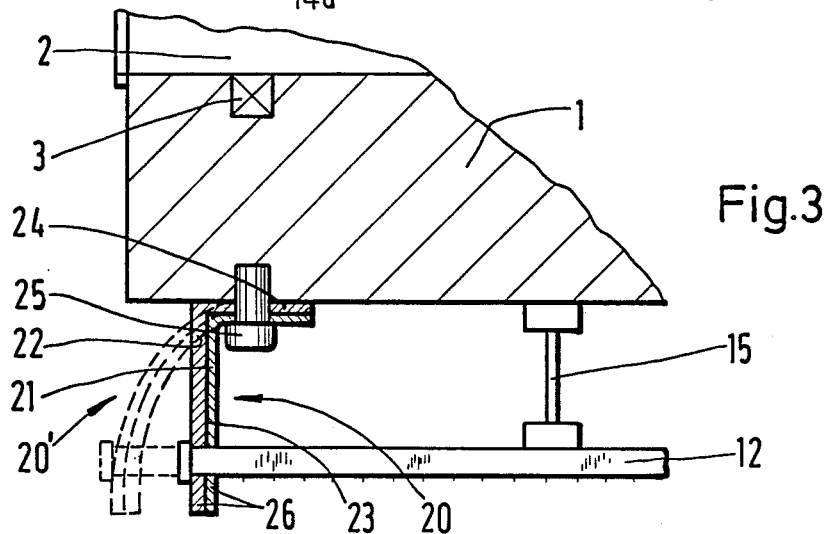
FIG. 3 is a schematic view of a further embodiment of the invention comprising a bimetallic element.

Moreover, a bimetallic element 20, such as the one shown in FIG. 3, may be used as the temperature responsive element and as the active element of the reversing drive. This bimetallic element is an angle section formed of two L-shaped angles 21 and 22 which are continuously and permanently joined to each other by a large-area soldered joint. Outer angle 22 may, for instance, be made of sheet iron while inner angle 21 may be made of brass. Leg 24 of outer angle 22 is directly fastened to spindle head 1 by suitable means such as threaded bolt 25 at the forward end portion of the spindle head which is highly sensitive to temperature variations. The end of the freely projecting other leg 26 of the bimetallic element 20 has the forward end of rule 12 secured thereto.

An alternative arcuate bimetallic element 20' is indicated in dotted lines in FIG. 3. It functions similarly to element 20.

Broadly speaking, it is only necessary that there be a thermally sensitive element connected to spindle head 1 so as to react to temperature changes in the head, which element is coupled to rule 12 in such a way as to adjust the longitudinal zero position of the rule in response to temperature changes. The thermally sensitive element is mounted to the spindle head so as to be responsive to that portion thereof which is particularly subject to being heated during operation.

Finally, it is also possible to provide temperature sensors in the particularly heated regions of the spindle head and to electrically connect those sensors to the control circuit (not shown). The program control circuit would then have to be designed such that zero shifting in accordance with the detected temperatures would take place in the control program.

In view of the above description, it is likely that modifications and improvements to the invention will occur to those skilled in the art which are within the scope of the appended claims.

What is claimed is:

1. A device for the temperature-responsive adjustment of the measuring points of two relatively movable machine tool parts, said device comprising:
   rule means mounted for limited longitudinal movement on a first machine part;
   a scanning head mounted on a second machine part;
   at least one thermally sensitive element mounted to said first machine part in such a way as to be thermally responsive to that portion of said first machine part that is particularly subject to being heated; and
   a reversing drive for coupling said thermally sensitive element to said rule means to longitudinally adjust the zero position of said rule means in response to thermally caused positional changes in said thermally sensitive element, said reversing drive comprising said thermally sensitive element and said coupling means combined in the form of a bimetallic element.

2. The device recited in claim 1, wherein said bimetallic element is formed as an angle section with two legs arranged at an angle with respect to each other, one leg thereof being secured to said first machine part, the other leg thereof being coupled to said rule means, said rule means being secured to said first machine part by means of leaf spring means.

3. The device recited in claim 1, wherein said bimetallic element is formed with an outer member and an inner member, said outer member being formed of sheet iron, said inner member being formed of brass, both said bimetallic element members being secured to each other over a large area.

4. The device recited in claim 2, wherein said bimetallic element is formed with an outer member and an inner member, said outer member being formed of sheet iron, said inner member being formed of brass, both said bimetallic element members being secured to each other over a large area.

5. A device for the temperature-responsive adjustment of the measuring points of two relatively movable machine tool parts, said device comprising:
   rule means mounted for limited longitudinal movement on a first machine part;
   a scanning head mounted on a second machine part;
   at least one thermally sensitive element mounted to said first machine part in such a way as to be thermally responsive to that portion of said first machine part that is particularly subject to being heated, said thermally sensitive element comprising a rod transversely mounted in a bore in said first machine part and having a free end extending externally of said first machine parts; and
   a reversing drive for coupling said thermally sensitive element to said rule means to longitudinally adjust the zero position of said rule means in response to thermally caused positional changes in said thermally sensitive element, said reversing drive being configured as a linkage mechanism including an angle lever having one arm thereon in contact with said free end of said rod and a second arm coupled to said rule mean.

6. A device for the temperature-responsive adjustment of the measuring points of two relatively movable machine tool parts, said device comprising:
   rule means mounted by means of leaf spring means for limited longitudinal movement on a first machine part;
   a scanning head mounted on a second machine part;
   at least one thermally sensitive element mounted to said first machine part in such a way as to be thermally responsive to that portion of said first machine part that is particularly subject to being heated; and
   means for coupling said thermally sensitive element to said rule means to longitudinally adjust the zero position of said rule means in response to thermally caused positional changes in said thermally sensitive element.

7. A device for the temperature-responsive adjustment of the measuring points of two relatively movable machine tool parts, said device comprising:
   rule means mounted for limited longitudinal movement on a first machine part;
   a scanning head mounted on a second machine part;
   at least one thermally sensitive element mounted to said first machine part in such a way as to be thermally responsive to that portion of said first machine part that is particularly subject to being heated, said thermally sensitive element comprising a rod transversely mounted in a bore in said first machine part and having a free end extending externally of said first machine part; and
   a reversing drive for coupling said thermally sensitive element to said rule means to longitudinally adjust the zero position of said rule means in response to thermally caused positional changes in said thermally sensitive element, said reversing drive being configured as a bevelled surface formed on said free end of said rod and a cooperating bevelled surface formed on a slide element, said slide element being slidably mounted on said first machine part and having means for engaging said rule means.

* * * * *